July 23, 1963  F. SCHOPPE  3,098,704
METHOD AND APPARATUS FOR MIXING AND CARRYING OUT REACTIONS
Filed Nov. 3, 1959
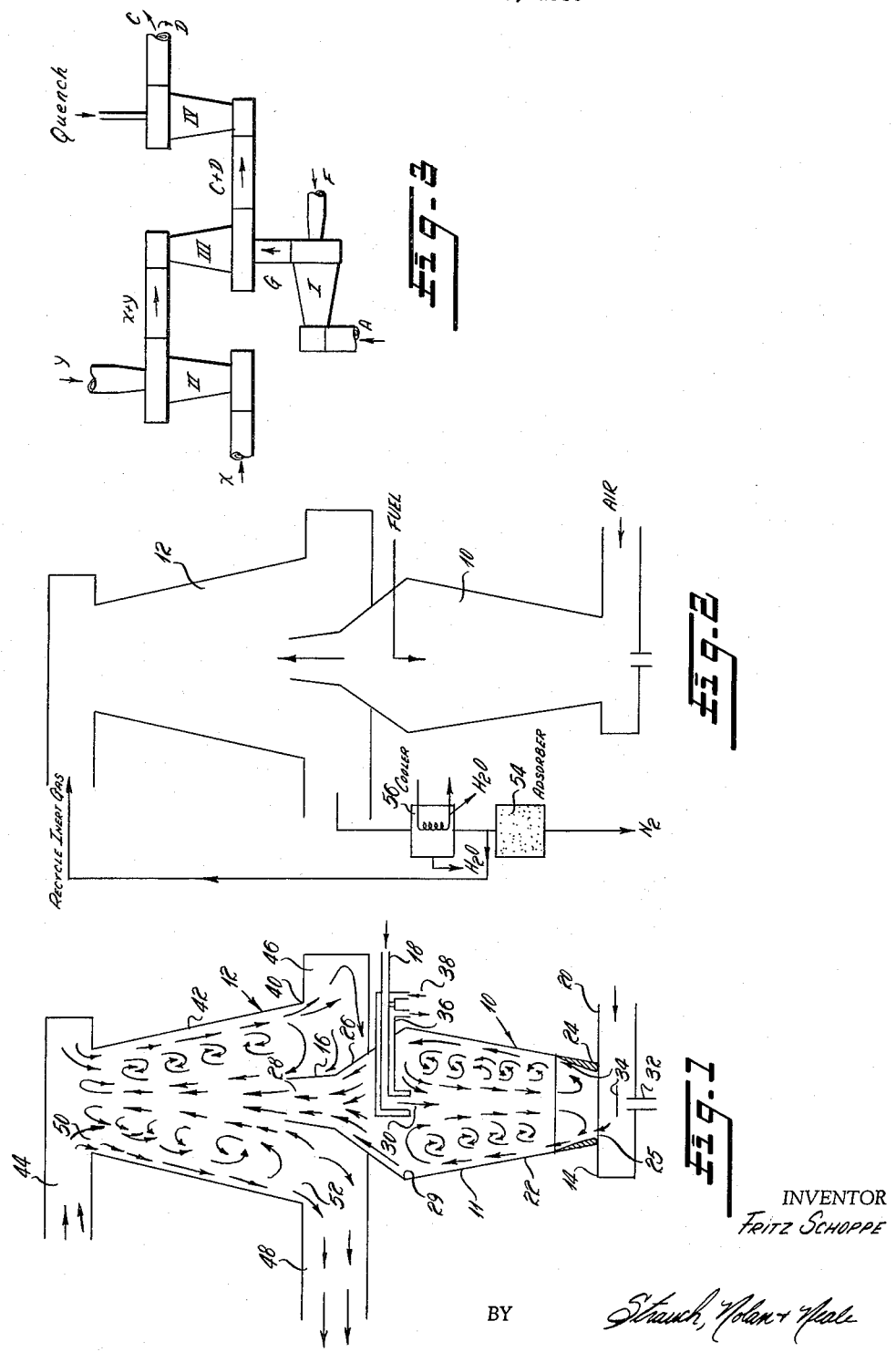
INVENTOR
FRITZ SCHOPPE
BY
Strauch, Nolan + Neale
ATTORNEYS United States Patent Office
3,098,704
Patented July 23, 1963

3,098,704
METHOD AND APPARATUS FOR MIXING AND
CARRYING OUT REACTIONS
Fritz Schoppe, Munich-Pasing, Germany, assignor to
Metallbau Semler, G.m.b.H., a company of Germany
Filed Nov. 3, 1959, Ser. No. 850,609
Claims priority, application Germany Nov. 2, 1956
19 Claims. (Cl. 23—1)

This invention relates to a novel method and apparatus for effecting the thorough mixing and complete reaction of chemical constituents and more particularly to a novel method and means for effecting such reactions using stoichiometric quantities of such constituents. This application is a continuation-in-part of my copending applications Serial Nos. 412,859 (now Patent No. 2,935,840) and 693,533 (now abandoned), filed February 26, 1954, and October 31, 1957, respectively.

In the conducting of chemical reactions between gases, liquids or pulverized solids, it is conventional practice to effect the combustion by utilizing an excess quantity of the combustive material. For example, in connection with the combustion of fuel and air, it is common practice to effect the combustion with a large excess of air over that stoichiometrically necessary to burn the fuel. It is often desirable, however, to reduce the quantity of combustive material used, not only because it often makes possible cleaner and more efficient combustion of the combustible but, as is often the case, to result in a more efficient use of materials and, quite often, significant savings in combustion costs.

When stoichiometric quantities of materials are used, however, numerous problems arise. For example, since only stoichiometric quantities of ingredients are present, unless the ingredients are completely and throughly mixed with one another, a large portion of the fuel will remain unreacted or unburned. Furthermore, even though the materials are completely mixed and combustion is reasonably complete, a problem of no mean proportion nevertheless continues to exist in the control of the high temperatures, which may exceed 2000° C., produced during the combustion reaction.

In the past, the foregoing problems have not been simultaneously solved. Even in those situations in which reasonably thorough mixing of ingredients was accomplished, the problem of temperature control has not been satisfactorily overcome. Ceramic linings in the combustion chambers, installed to withstand the high temperatures involved, have not been the answer to the problem in view of their inability to withstand alternating temperature stresses and the like over an extended period of time.

In the light of the foregoing, it is a primary object of the present invention to provide a process and apparatus for carrying out stoichiometric chemical reactions between gases, liquids or pulverized solids in which complete combustion of the combustible material takes place and in which reaction temperatures are completely and economically controlled.

It is a further object of the present invention to effect complete reaction between stoichiometric quantities of reactants at reaction temperatures of more than 2000° C. in reaction chambers without special high-temperature ceramic linings.

It is another object of the present invention to effect the complete reaction between fluid reactants by means of a novel combination of tubular chambers in each of which an annular intermediate zone of turbulence is obtained between inner and outer coaxial zones of counter-flowing high speed streams of fluid by the introduction of a first fluid into one end of the chamber in a manner causing spiraling of the fluid in an elongated tubular path from the one end to the other end of the chamber, a second fluid to be mixed with the first fluid being preferably introduced into the chamber at said other end.

It is still a further object of the present invention to effect complete combustion between stoichiometric quantities of reactants by using a combination of chambers as above described in which the reaction products of one of said chambers is utilized as the second fluid to be mixed with the first fluid of the second of said chambers.

It is yet another object of the present invention to effect complete combustion between fluid reactants by using a combination of chambers as above described in which the first fluid of the second of said chambers is a fluid cooler than and inert to said first and second fluids in the first of said chambers and to any reaction product thereof, and which serves to quench the latter fluids to terminate any further chemical reaction between them.

It is another object of the present invention to utilize a novel combination of tubular chambers as above described in a manner making possible the efficient and economical carrying out of a plural stage process.

Further novel features and other objects of this invention will become apparent from the following detailed description, discussion and the appended claims taken in conjunction with the acompanying drawings showing a preferred structure and embodiment, in which:

FIGURE 1 is a schematic view showing a combination of mixing chambers as arranged for the carrying out of reactions using stoichiometric quantities of reactants;

FIGURE 2 is a schematic diagram showing the apparatus of FIGURE 1 as part of a continuous system for the production of nitrogen; and FIGURE 3 is a schematic view showing the interconnection of a plurality of the mixing chambers used in connection with the instant invention for the carrying out of a continuous process.

In accordance with the instant invention, it has been found that the foregoing objects may be achieved by means of a combination of basic mixing or reacting chambers of the type disclosed in my copending application Serial No. 412,859 (not Patent No. 2,935,840). Such a combination may best be described by reference to FIGURE 1 of the drawings.

As there shown, two reaction chambers 10 and 12, of the type described in said application, are arranged in series with one another. A first chamber 10 generally comprises a main tubular portion 11 with an inlet section 14. An outlet section 16 and a conduit 18 are provided for the introduction of a second fluid into the reaction chamber. Inlet section 14 must be so constructed as to impart a helical twisting or swirling motion to fluid introduced into it. In its preferred form, inlet 14 is accordingly made in the shape of a volute, with an outer tangential peripheral entry portion 20. If desired, however, other types of inlet devices can be used, including inclined vanes, as more particularly described in application Serial No. 412,859 (now Patent No. 2,935,840).

Main tubular portion 11 is divided into two sections, a frusto-conical section 22 having its smaller end 24 secured as by welding to inlet section 14. A conically constricted outlet section 26 is secured adjacent the large end of frusto-conical chamber section 22. As may be seen in FIGURE 1, constricted outlet 26 terminates in a restricted opening 28 leading into the large end of mixing or reaction chamber 12.

The length of frusto-conical section 22 should be at least approximately 1.5 times its average diameter for satisfactory operation, with a ratio of 2:1 being preferred. The preferred included angle of divergence of the walls of frusto-conical section 22 is 25°. The internal surface of frusto-conical section 22 is smooth. As more fully described in said application Serial No. 412,859 (Patent No. 2,935,840), while section 22 is preferably of frusto-conical shape, as illustrated in FIGURE 1, this section may, if desired, be of generally cylindrical form.

A second inlet fluid conduit 18 has its outlet end 30 positioned substantially on the longitudinal axis of mixing chamber 10 and is preferably located substantially at the intersection between frusto-conical section 22 and constricted outlet section 26, though it may be projected further into the chamber in special cases. By positioning conduit 18 at the outlet side of chamber 10 and in the position shown in FIGURE 1, the feeding of a second fluid into the mixing chamber takes place under more favorable conditions than would be the case if the second feed were positioned adjacent the inlet end of said chamber as it provides more stable flow conditions, i.e., it has a minimum effect upon pressure patterns and flow characteristics of the fluid circulating in chamber 10, as described more fully below. If desired, however, an inlet conduit 32 may be positioned adjacent the inlet end of chamber 10 coaxially with said chamber either in addition to or in lieu of conduit 18. As shown, in particular cases, a baffle 34 can be provided immediately forward of the outlet end of conduit 32 to disperse fluid injected through said conduit into the fluid stream entering entry portion 20 and to prevent disruption of the flow patterns of the fluid circulating in chamber 10. If desired, conduit 18 may be surrounded by a heat exchange jacket 36 through which a coolant 38 may be suitably circulated.

As above described, constricted outlet section 26 at the large end of mixing chamber 10 extends coaxially into mixing chamber 12 at the large end 40 of its frusto-conical tubular portion 42. Inlet section 44 and frusto-conical tubular section 42 are substantially identical to the corresponding portions of chamber 10, as described above. As shown in FIGURE 1, however, chamber 12 has an outlet device 46 in the form of a volute, terminating in a tangential peripheral exit section 48.

The operation of the above-described device to achieve complete combustion of a mixture of stoichiometric quantities of reactants will now be described using the combustion of fuel with air as an example, though it is to be understood that the invention is applicable to the mixing and chemical reaction between other gases, liquids or pulverized solids.

Air is introduced from a suitable source into the inlet volute 20, thence into the inlet 25 of frusto-conical section 22, and flows in a helical path through the chamber 10 as indicated by the arrows adjacent the wall from the inlet 25 toward the end 29 of frusto-conical section 22. For convenience this flow adjacent the inner surface of the tube 22 will be referred to as "forward" flow. (In FIGURE 1, only the components of the airflow in an axial direction are depicted. In addition there is superimposed on the axial components of flow a tangential component due to the spiral nature of the inlet flow from the volute 14. The tangential component is omitted in the drawings for the sake of clairity.) The helical angle of flow of the air from inlet 25 to the end 29 of frusto-conical section 22, with respect to the axial direction, varies between approximately 20 and 30 degrees.

Upon arriving at end 29 of frusto-conical chamber section 22, a substantial part of the forward air flow undergoes a change in direction or inflow, radially toward the axis of chamber 10, whereupon it completely reverses its direction and flows back toward the inlet end 25 along the axis of frusto-conical section 22. This inner flow will be termed "reverse flow" for convenience. At the inlet end 25 any remaining reverse flow will again reverse its direction of flow, in what will hereinafter be termed an "outflow," being radially divided as it flows radially outward, and then returns back with the forward flow of inlet air toward the end 29.

Between the concentric zones of forward and reverse flow there is formed a zone of violent, intense turbulence. Fluid is constantly flowing from the zones of forward and reverse flow into and creating the turbulent zone, the thickness of the zone of forward flow diminishing from inlet to outlet and the cross section of reverse flow diminishing from outlet to inlet.

The creation of the counterflowing zones is due to pressure characteristics caused by flow of the air. When the air is introduced through inlet 25 in a direction tangential to the frusto-conical wall 22 of chamber 10 by the inlet section 14, a high speed spiral flow along the inner surface of the frusto-conical wall 22 is generated. This spiral flow can be assumed as an approximation of a potential vortex. Since, in a vortex, the angular momentum (neglecting friction) must be constant, the tangential velocity of the air at the inlet end 25 of the chamber 10 will be greater than its tangential velocity at the end 29 of frusto-conical section 22 because, in a frusto-conical tube, the radius increases from the small end to the large end.

The static pressure at any point in the chamber is determined by Bernoulli's law:

$$p + \tfrac{1}{2} du^2 = \text{a constant}$$

where:

$p$=static pressure in the chamber
$d$=density of the medium
$u$=velocity of the flow Since the sum of the factors of the equation must be constant, $p$ must be lower in a zone of high velocity and higher in a zone of low velocity. At the small inlet end 25 of the frusto-conical section 22, where the velocity of the flow is high, the average static pressure will be lower than at its large end 29, where the velocity is lower.

Because the spiral flow is confined within a tubular chamber wall, the vortex theory suffers a modification. The low vortex theory pressure at the inlet end will occur in a central zone surrounded by an outer annular zone of very high pressure, high speed fluid adjacent the confining tubular chamber wall 22 which is developed because of centrifugal forces in the spiraling fluids being confined by the tubular wall against outward movement. Fluids normally flow from zones of high pressure to zones of low pressure. In this chamber, however, the air in the outer zone of fluid under centrifugally developed pressure adjacent inlet end 25 cannot return against the centrifugal forces toward the low pressure zone at inlet end 25 so the fluid in the outer annular zone progresses along the chamber wall to the large end 29 of section 22. Near end 29, because of the progressive decrease in velocity of the fluid, centrifugal forces in the spiraling fluid can no longer keep the air in the outer zone under a high pressure against the wall of the tubular chamber and, because the vortex pressure has increased, the pressure distribution of the air radially of the chamber becomes flatter and an inflow from the outer zone of air to the center of large end 29 will result. The central zone pressure at the small inlet end 25 is lower than the central zone pressure at the large end 29 and reverse flow of the air will accordingly take place from the large end 29 to the small end 25 in an inner zone along the axis of the chamber.

The interaction between the forward flow of air and the coaxial concentric reverse flow gives rise to an annular zone of intense continuously violent turbulence, obtained without any obstacle of any kind, in the interior of chamber 10. The turbulence is the type which occurs between parallel streams of fluid and which is discussed and computed theoretically in N.A.C.A. Report 979, published in 1950 and entitled "On Stability of Free Laminar Boundary Layer Between Parallel Streams," by Martin Lessen. For convenience, this turbulent flow will be termed the Schlichting-Lessen or S-L type of turbulent flow.

In applicant's invention, this turbulent flow occurs as an elongated annular zone between the high speed inner and outer annular zones, creating a neutral speed zone, in effect a floating or stationary (suspended) zone, of turbulence, which, except for the outer and inner zones of high speed air, can completely fill the interior of chamber 10.

Because of the inherent characteristics of the S-L type of turbulent flow, it will occur between two adjacent fluid flows, the adjacent zone portions of which are parallel and between which there is a differential of flow velocity through a range from very low (10–50) Reynolds Numbers to an infinite Reynolds Number. A mixing or combustion chamber utilizing the S-L type of turbulent flow has no known upper speed limit of input air flow because an excellent unstable flow (with violent turbulence) can be maintained up to values approaching infinite Reynolds Number. The air and any other fluid properly introduced into the chamber will be completely mixed in the floating annular turbulent zone between the high speed, practically parallel, forward and reverse streams of fluid.

The adjacent portions of the concentric inner and outer annular zones extends substantially the entire length of the chamber, which as aforedescribed is at least 1.5 times the average chamber diameter. Therefore if one-half (either the upper half or lower half) of the cross-section of the two annular concentric zones of flows is theoretically considered, it will be seen that the length of substantially parallel adjacency of two paths is approximately three times the combined average thickness of the two paths. Thus the two paths of flow must be maintained within a confined adjacent relationship for a predetermined dimension materially greater than the combined thickness dimension through the two adjacent flow paths to create the desired highly violent S-L type of turbulence which must be generated in an elongate zone which in the described chamber is an elongate annular zone.

In view of this fact, if a fluid fuel is introduced into chamber 10 through conduit 18 and into the reverse flow of air, portions of the fuel will be continuously passing into the turbulent zone and will be thoroughly mixed with the air. Alternatively or additionally, the same or additional fuel may be introduced through conduit 32.

Since additional fluid is being continuously fed into chamber 10 and eventually into the turbulent zone through inlet 14 and inlets 18 and/or 32, the thoroughly mixed fluid in the turbulent zone must have an exit. As shown in FIGURE 1, this exit is provided at the large end 29 of the frusto-conical section 22 in the form of a conically restricted outlet section 26.

By initiating combustion in chamber 10 in a conventional manner, combustion will take place in the turbulent zone in which the air and fuel are thoroughly mixed and the fuel will burn with a flame which extends far out of chamber 10 and into chamber 12. Since no mixing of fuel and air takes place in the outer annular zone of high speed, helically moving air, this outer zone will effectively provide a blanket of cool air of slight thickness and great stability about the flaming turbulent zone and will maintain the walls of chamber 10 sufficiently cool so that there will be no danger of melting of the material of the walls, even if common sheet metal is used.

The thickness and course of the outer annular blanket of cool air can easily be adapted to the requirements of a given combustion process by regulation of the flow conditions in chamber 10. This thickness is preferably relatively large at inlet 25 of chamber 10, the thickness gradually diminishing in the direction of end 29 of section 22 as aforestated.

Due to the thorough mixing effected by use of the process and apparatus described above, the combustion which takes place in chamber 10 is reasonably complete and, generally speaking, is much more efficient than the combustion processes carried out in conventional mixing chambers in current day use. Notwithstanding this fact, however the combustion which takes place is invariably not 100% complete, and the combustion products leaving conically restricted outlet 26 accordingly include unburned fuel. To effect substantially complete combustion, and to therefore take full advantage of the use of stoichiometric quantities of fuel and air in chamber 10, a second reaction chamber 12 is used in series with reaction chamber 10, as shown in FIGURE 1.

In accordance with the foregoing, a cold inert gas (e.g., returned waste gases or steam) is admitted into volute 44 in a manner identical to that in which the air was admitted into volute 14 of reaction chamber 10. As before, the inert gas will flow in a helical path through chamber 12 as indicated by the arrows adjacent the walls of frusto-conical section 42 from the inlet section 50 toward the outlet 52. Upon arriving at outlet end 52, a substantial part of the forward inert gas flow undergoes a change in direction radially toward the axis of chamber 12, whereupon it completely reverses its direction and flows back toward inlet end 50 along the longitudinal axis of section 42. At inlet end 50, the reverse flow again reverses its direction of flow and returns back with the forward flow of inlet inert air toward outlet end 52. As before, a zone of violent, intense turbulence is formed between the concentric zones of forward and reverse flows.

Since the gases exiting from the outlet 16 of chamber 10 will also include a quantity of unreacted gases, the remainder of the unburned fuel in these gases will be fully burned in chamber 12 within the turbulent zone in that chamber. The reaction products of the fully burned fuel, together with the inert gas, will eventually exit out of the discharge spiral 46 of chamber 12.

By suitably selecting the temperature and admission velocity of the inert gas ejected into the volute 44 of chamber 12, the reaction (combustion) between the fuel and the air in chamber 12 can effectively be "frozen" at any predetermined desired point. In other words, the greater the admission velocity of inert gas into chamber 12, the smaller the residence time of the fuel and air in chamber 12 and, accordingly, the smaller the reaction time in that chamber. Also, if the inert gas is cold enough, the temperature of the combustion gases may be effectively reduced to a point below which further combustion will not take place. In any event, as is the case in connection with the admission of the air into chamber 10, the admission velocity of the inert gas must be maintained above the minimum Reynolds Number for the production of S-L type of turbulent flow between the parallel streams of high speed fluid.

The above-described apparatus and procedure make possible not only the complete combustion of stoichiometric quantities of reactants but, as well, the use of combustion chambers having relatively cold walls throughout the range of operation of the combustion process, resulting in long combustion chamber life. Since no refractory wall materials are required, the combustion chambers may be constructed of light and inexpensive materials. The use of the second reaction chamber makes possible the adaptation of the basic mixing chamber described in my copending application Serial No. 412,859 (now Patent No. 2,935,840) to a wide variety of chemical reactions and mixing processes, particularly if the danger of thermal or chemical attack of the chamber walls is to be prevented. The use of the cold inert gas in the secondary chamber makes possible closely controlled chemical reactions and the "freezing" of the reaction at any desired point. If desired, of course, a second reaction may be effected in chamber 12 by substituting a reactant for the inert gas.

The novel apparatus and method for its use described above also make feasible a highly efficient process for the production of nitrogen. The greatest portion of the commercial nitrogen currently produced is obtained from air by eliminating its oxygen content. Of the various methods used for the production of nitrogen, two are in widespread use: (1) the Linde method involving the separation of air into its constituents by liquefaction and (2) the stoichiometric combustion of air by means of a fuel, the atmospheric oxygen being substantially completely converted into $CO_2$, $H_2O$ and $SO_2$ and the latter substances being ultimately separated from the nitrogen in that form.

The latter method is customarily carried out by burning air and fuel in stoichiometric quantities in a combustion chamber. Of the combustion products, a portion of the $H_2O$ is preliminarily removed in a condenser, the balance of the $H_2O$ being eliminated by means of an adsorbent, such as silica gel. The $CO_2$ is then scrubbed out by means of a caustic solution or water under pressure. The remaining gaseous product is then purified in a separate step to remove the traces of $SO_2$ so that, aside from the customary traces of rare gases, substantially pure nitrogen remains.

In accordance with another important feature of the present invention, I have discovered that the foregoing procedure for the production of nitrogen by the stoichiometric combustion of air with a fuel may be greatly simplified by utilization of the novel method of combustion earlier described in conjunction with the use of a zeolite adsorbent. More specifically, zeolite, a known alumino-silicate, which has been activated by the expelling of a part of its water of crystallization without any change in its crystal structure, will adsorb $H_2O$ and all triatomic molecules of similar structure, such as $CO_2$ and $SO_2$, while leaving unaffected the diatomic molecules such as nitrogen, CO, $H_2$, etc. Since the combustion products resulting from the combustion of air by the plural combustion chamber method heretofore described contain substantially only triatomic molecules ($CO_2$, $H_2O$ and $SO_2$) in addition to nitrogen, pure nitrogen is readily produced by passing the combustion products of the second reaction chamber through an activated zeolite adsorbent 54, as shown in FIGURE 2. The $CO_2$, $H_2O$ and $SO_2$ will be readily adsorbed by the zeolite, leaving substantially pure nitrogen.

Since the advantages of this process would be destroyed if the reaction gases in the second chamber were contaminated with extraneous gases and the like, the cool gas injected into the inlet end of the second reactor should preferably be obtained by recycling a portion of the inert gas leaving the cooler 56, as shown in FIGURE 2.

If desired, the adsorbing power of the zeolite relative to the $CO_2$ and $SO_2$ may be increased by the preliminary removal of a portion of the $H_2O$ in the feed gas before passing it through the zeolite. As shown in FIGURE 2, one method of doing this is to pass the reaction products from chamber 12 through a condenser 56. Also, if desired, the second reactor may be eliminated and the reaction products of the first reactor treated directly for the separation of nitrogen. The only limitation on such a procedure is that the quantity of diatomic molecules such as CO, $H_2$, etc. in the combustion products from the first combustion chamber must be below the maximum contamination permissible in the nitrogen to be produced, since these diatomic molecules are not adsorbed by the zeolites, as set forth above. While it is not generally possible to effect the combustion to produce nitrogen of the desired purity under prior methods of combustion, it is possible to do so, though not to as great a degree as with the combined reactors, with the single combustion chamber as above described.

Furthermore, the novel method for producing nitrogen as set forth above may also be employed when materials other than air are used as the nitrogen-oxygen-containing gas, i.e., the reaction product from the combustion of fuel with an excess of air as in steam boilers and the like.

In the foregoing paragraphs, several novel and inventive applications of the basic mixing and combustion chamber disclosed in my copending application Serial No. 412,859 (now Patent No. 2,935,840) have been described. In addition to the foregoing, still additional uses are feasible. For example, as schematically shown in FIGURE 3, my novel combustion chamber may be utilized at each stage of a plural stage process. In the first stage I of the process, air A and fuel F are mixed together in a first reaction chamber to produce a hot, inert gas G. In the second stage II, two reactants X and Y are mixed together, the mixture $X+Y$ being mixed in the third stage reaction chamber III with the hot gas G from the first stage I, at which stage substances X and Y react to form reaction products C and D. By mixing reaction products C and D in the fourth stage reaction chamber IV with an inert quenching medium such as water, the reaction may be stopped at any desired point. Reaction products C and D may then be separated and further processed in additional apparatus (not shown).

Numerous advantages may be obtained by the plural use of my novel mixing and combustion chambers as set forth above. For example, the highly efficient combustion taking place in the combustion chambers makes possible the use in the first stage I combustion chamber of a fuel of poor heating value which would not burn properly in conventional combustion chambers. Furthermore, since the fuel F will be drawn into chamber I by means of the axial suction at the large end of the frustoconical tubular section, the fuel need not be pumped and may therefore be hot or contain impurities without fear of destruction of a pumping system. And this is the case despite considerable variations in internal pressures in the combustion chamber. The life of chambers I and III may be considerably prolonged despite the use of non-refractory materials in view of the thin blanket of cool fluid shielding the walls of the chambers. Also, due to the highly efficient mixing action of the apparatus involved, a quenching period can be employed in chamber IV which is considerably shorter than that required in conventional apparatus.

In the foregoing passages, I have attempted to define the inventive subject matter with sufficient completeness and clarity to enable one skilled in the art to fully practice the invention. Since the instant inventions are improvements of the basic apparatus and systems disclosed in my copending applications Serial Nos. 412,859 (now Patent No. 2,935,840) and 693,533 (now abandoned), however, it is to be understood that additional details of construction and operation may be obtained by reference to said applications. For this purpose, I hereby incorporate by reference the pertinent disclosures of those applications.

When used in the claims, the term "fluid" shall be construed to include gases, liquids or pulverized solids which exhibit fluid qualities during flow thereof.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of causing a plurality of reactants to react comprising: creating a spiral outer flow of a first reactant; confining the spiral flow to a fixed tubular path of sufficient length so that at a distance down the flow path a reversal in the flow of the first reactant occurs in the form of an inflow becoming a concentric counter-flow in a path along the axis on the inner side of the spiral flow, whereby an annular elongated zone of intensely violent turbulence occurs between the spiral flow and the counterflow; feeding a second reactant into and substantially parallel to the direction of one of said paths of flow of said first reactant, whereby said second reactant will pass into said zone of turbulence and mix with said first reactant; causing said first and second reactants to react in said turbulent zone to form a reaction product; creating a second spiral outer flow of a fluid inert to said first and second reactants and said reaction product; confining the second spiral flow to a fixed tubular path of sufficient length so that at a distance down the path a reversal occurs in the flow of said inert fluid in the form of an inflow becoming a counterflow along the axis on the inner side of the second spiral flow, whereby a second annular elongated zone of intensely violent turbulence occurs between the second spiral flow and its counterflow; feeding an unreacted portion of said first and second reactants from said first mentioned turbulent zone into and substantially parallel to one of said paths of flow of said inert fluid whereby said portion of reactants will pass into said second zone of turbulence and continue to react therein; and discharging the reaction product of said first and second reactants from said second zone of turbulence.

2. A method of causing a plurality of reactants to react as defined in claim 1, wherein said second reactant is fed into one end and coaxially of said concentric first reactant flow paths.

3. The method defined in claim 2 wherein said unreacted portion of said first and second reactants from said first mentioned turbulent zone is fed into the end of said fixed tubular path of said second spiral flow substantially at the location at which the inflow of inert fluid passes into the counterflow; and the reaction product of said first and second reactants is discharged at the same end of said fixed tubular path.

4. The method defined in claim 2 wherein the temperature of said inert fluid is low relative to the temperature of said unreacted portion of said first and second reactants and wherein said inert fluid is used to quench said first and second reactants to terminate their reaction with one another at a predetermined point.

5. The method defined in claim 2 wherein the relative quantities of said first and second reactants are approximately those stoichiometrically required for their complete reaction.

6. A method of causing a plurality of reactants to react comprising: creating a spiral outer flow of a first fluid reactant; confining the spiral flow to a fixed tubular path of sufficient length so that at a distance down the flow path a reversal in the flow of the first fluid reactant occurs in the form of an inflow becoming a counterflow along the axis on the inner side of the spiral flow, whereby an annular elongated zone of intensely violent S-L type of turbulence occurs between the spiral flow and the counterflow; feeding a second fluid reactant into and substantially parallel to the direction of one of said paths of flow of said first fluid reactant, whereby said second fluid reactant will pass into said zone of turbulence and mix with said first fluid reactant; causing said first and second fluid reactants to react in said turbulent zone to form a reaction product; creating a second spiral outer flow of a third fluid; confining the second spiral flow to a fixed tubular path of sufficient length so that at a distance down the path a reversal occurs in the flow of said third fluid in the form of an inflow becoming a counterflow along the axis on the inner side of the second spiral flow, whereby a second annular elongated zone of intensely violent S-L type of turbulence occurs between the second spiral flow and counterflow; feeding the reaction product from said first mentioned turbulent zone into and substantially parallel to the direction of one of said paths of flow of said third fluid, whereby said reaction product will pass into said second zone of turbulence and mix with said third fluid; causing said reaction product and said third fluid to react in said second zone of turbulence to form a second reaction product; and discharging said second reaction product from said second zone of turbulence.

7. The method defined in claim 6 wherein said second fluid reactant is a gas of poor heating value.

8. The method defined in claim 6 additionally comprising the steps of creating a third spiral outer flow of a fourth fluid; confining said third spiral flow to a fixed tubular path of sufficient length so that at a distance down the flow path a reversal occurs in the flow of said fourth fluid in the form of an inflow becoming a counterflow along the axis on the inner side of the third spiral flow, whereby a third elongated zone of intensely violent S-L type of turbulence occurs between the third spiral flow and counterflow; feeding a fifth fluid into and substantially parallel to the direction of one of said paths of flow of said fourth fluid, whereby said fifth fluid will pass into said third zone of turbulence and mix with said fourth fluid; and using the discharge from said third zone of turbulence as said third fluid to create said second spiral flow.

9. The method defined in claim 6 comprising: the use of said second reaction product discharged from the second zone of turbulence to create a third spiral outer flow; confining the third spiral flow to a fixed tubular path of sufficient length so that at a distance down the flow path a reversal occurs in the flow of said discharge fluid in the form of an inflow becoming a counterflow along the axis on the inner side of said third spiral flow, whereby a third annular elongated zone of intensely violent S-L type of turbulence occurs between the third spiral outer flow and counterflow; feeding a quenching fluid into and substantially parallel to the direction of one of said paths of flow of said second reaction product, whereby said quenching fluid will pass into said third zone of turbulence and mix with said second reaction product, reducing the temperature of said second reaction product sufficiently to terminate any further reaction between its constituents; and discharging said second reaction product and said quenching fluid from said third zone of turbulence.

10. A plurality of fluid chambers, each chamber having means for producing three elongated concentric zones of fluid within said chamber in the form of an annular, elongated, tubular, intermediate zone of S-L type of turbulence between inner and outer coaxial zones of counterflowing fluid streams; each of said S-L turbulence producing means comprising structure including a frusto-conical tubular wall the axial length of which is at least equal to its largest diameter and an inlet means at the small end of said tubular wall constructed to impart a spiraling vortical flow to fluid introduced through said inlet means into one end of the tubular wall and directed toward the other end; each of said chambers having a fluid outlet; the outlet of one of said chambers constituting a restricted flow converging wall portion secured to the large end of said tubular wall of said one chamber and connected to the large end of the frusto-conical wall of a second of said chambers and situated relative thereto to direct fluid discharged from said large end of said one chamber into, parallel to and in the direction of flow of the inner zone of said counterflowing fluid streams in said second chamber.

11. The combination of chambers defined in claim 10 wherein means are provided and connected to said one chamber for introducing a second fluid into and parallel to one of the zones of and in the direction of said counterflowing fluid stream in said one chamber near one of the ends of the frusto-conical tubular wall.

12. A plurality of fluid chambers as defined in claim 10, and including an adsorption chamber in fluid flow communication with the outlet of said other chamber so that discharge from the outlet of said other chamber will pass through said adsorption chamber.

13. A combination of chambers as defined in claim 10 wherein said one and said second frusto-concical chambers are disposed coaxial, the large ends of both of said two chambers being outlet ends disposed adjacent one another; and said flow converging outlet, which is connected to the large end of said one chamber for receiving fluid passing therefrom, is disposed coaxially from the periphery of the large end of said one chamber with its egress disposed substantially centrally of the large end of said second chamber.

14. A combination of chambers as defined in claim 13 wherein the outlet of said second chamber comprises a volute connected to the large end of said second chamber to receive and direct fluid from said second chamber, and said volute surrounds said flow converging outlet from said one chamber.

15. A combination of chambers as defined in claim 14 wherein means are provided for introducing a second fluid into the small end of said one chamber.

16. A plurality of fluid chambers at least three in number, each of said plurality of chambers having means for producing three elongated concentric zones of fluid within said chamber in the form of an annular, elongated, tubular, intermediate zone of S-L type of turbulence between inner and outer coaxial zones of counterflowing fluid streams; said means comprising structure including a tubular frusto-conical wall the axial length of which is at least equal to diameter of its large end and an outlet means connected to the small end of said wall constructed to impart a spiraling vortical flow to fluid introduced through said inlet means into said small end of the tubular wall and directed toward the other end; each of said chambers having a fluid outlet at its large end; means connected to the outlet of a first one of said chambers being in fluid communication with the inlet means of a second of said chambers to direct discharge fluid from said first chamber into said second chamber; the outlet of the third of said chambers being positioned relative to and connected to said second chamber so that fluid discharged from the said outlet of said third chamber will pass into and parallel to one of the counterflowing fluid streams in said second chamber.

17. A combination of chambers as defined in claim 16 wherein said inlet means for each said at least three chambers and said fluid outlets for said at three chambers are in volute form so that the outlet volute of said first chamber directs fluid therefrom into the inlet volute of said second chamber and the outlet volute of said third chamber directs fluid therefrom into said second chamber in a path parallel with the axis of the second chamber.

18. The combination of chambers defined in claim 16 wherein said first and said third chambers are each provided with conduit means adjacent one end of its tubular wall for introducing fluid into and coaxially of one of the zones of the counterflowing fluid streams in said respective associated chambers.

19. The combination of chambers defined in claim 18 wherein a fourth such fluid chamber is provided; the fluid outlet of said second chamber being in fluid communication with the inlet means of said fourth chamber, whereby the discharge fluid from said second chamber may be introduced into said fourth chamber; and wherein a conduit for the introduction of a quenching medium is provided near one of the ends of the tubular wall of said fourth chamber; said conduit being situated relative to said end of said tubular wall so as to direct fluid into and parallel to the inner zone of the counterflowing fluid streams in said fourth chamber.

References Cited in the file of this patent

UNITED STATES PATENTS

| | | |
|---|---|---|
| 669,302 | Franklin | Mar. 5, 1901 |
| 1,069,243 | Fogler | Aug. 5, 1913 |
| 1,154,172 | Brownlee | Sept. 21, 1915 |
| 1,547,688 | Romanelli | July 28, 1925 |
| 1,973,712 | Justheim | Sept. 18, 1934 |
| 2,314,827 | Hortvet | Mar. 23, 1943 |
| 2,935,840 | Schoppe | May 10, 1960 |

OTHER REFERENCES

"Chemical and Engineering News," vol. 32, page 4786, Nov. 29, 1954.

Barrer in "Chemistry Society Quarterly Review," vol. III, 1949, pages 293–320.